United States Patent Office 3,433,968
Patented Mar. 18, 1969

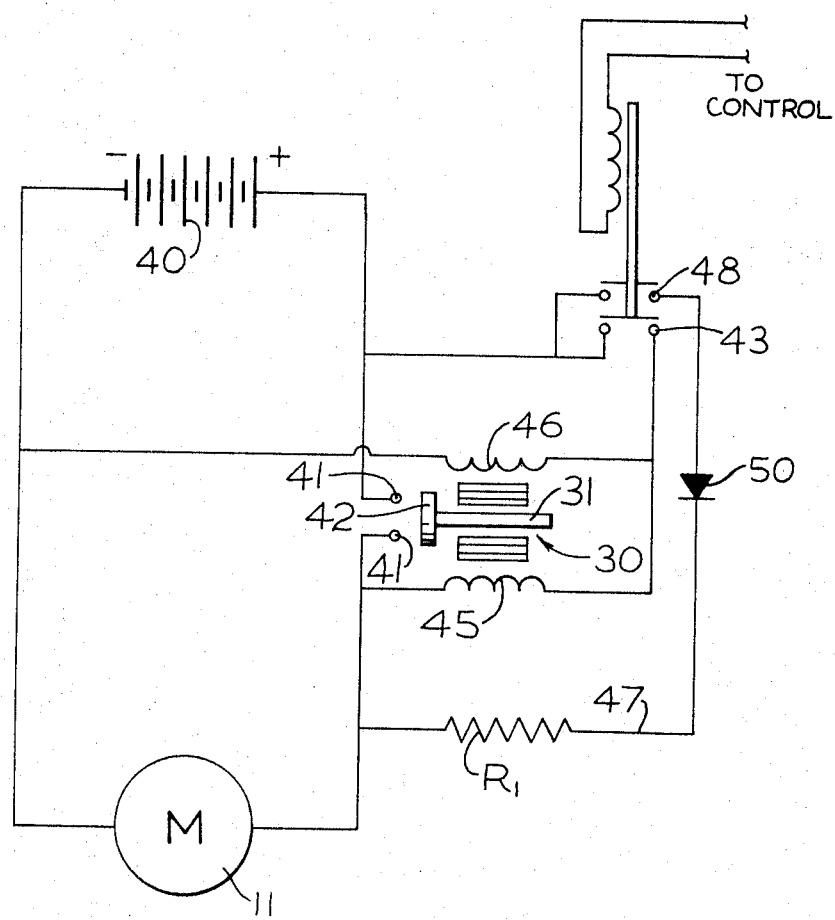

3,433,968
POSITIVE INDEXING CRANKING SYSTEM
Robert H. Broyden, Peoria, Ill., assignor to Caterpillar Tractor Co., Peoria, Ill., a corporation of California
Filed Nov. 18, 1966, Ser. No. 595,461
U.S. Cl. 290—37
Int. Cl. F02n 11/06
1 Claim

ABSTRACT OF THE DISCLOSURE

Starting systems with electric cranking motors having a protruding shaft, a shift assembly mounted on the shaft, a gear slidably mounted on said shaft so it is movable by the shift assembly into engagement with gearing for cranking an engine and a solenoid connected to the shift assembly to cause movement of the gear into engagement, can be improved if the solenoid and a resistive circuit are connected in parallel to a common power source through the winding of the motor and energized simultaneously so that the electric cranking motor will rotate the gear as the solenoid moves the gear into engagement for cranking.

---

Figure 1:
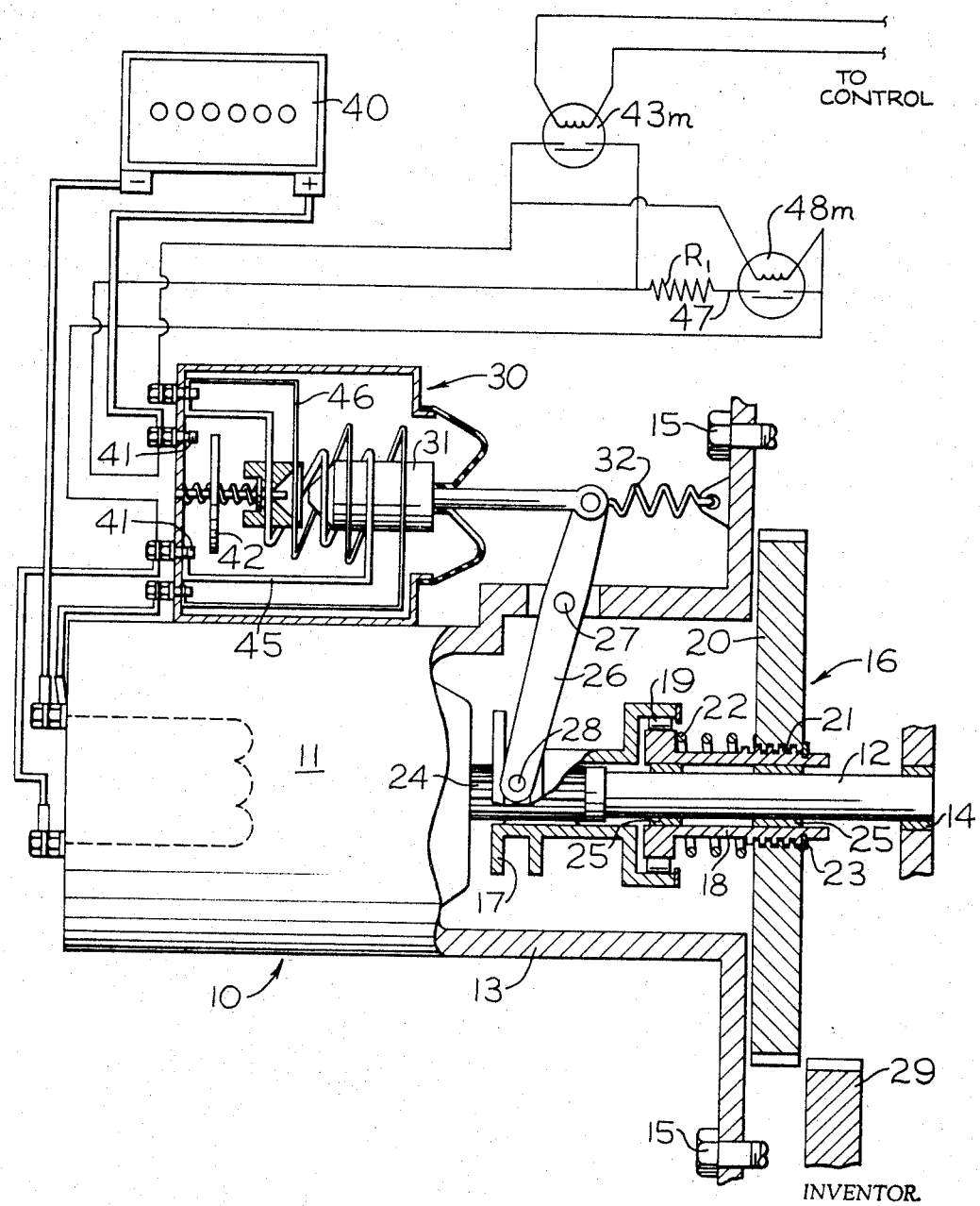

This invention relates to a starting motor system for cranking engines during starts, and more particularly to an improved starting system with a more reliable engagement of the cranking gear train.

Typical of the type of starting gear train with which this invention is associated are those shown in U.S. Patent No. 2,899,829, issued to Smith, wherein a cranking gear train is shifted into meshing engagement with a ring gear capable of driving the rotary mechanisms of the engine, followed by driving the gear train with an electric motor to turn the engine over.

Today's larger reciprocating engines and gas turbine engines require heavy duty electric starting motors to crank them. Thus, electric starting motors have been redesigned to provide additional torque and the voltages in the starting circuit have been increased for additional torque which is necessary for cranking such engines. Characteristic of heavy duty starting motors is greatly increased armature acceleration during the cranking cycle, which causes serious problems if the starting gear train is not properly engaged during cranking.

Often the improper indexing or meshing of the gear train in starting gear trains are referred to as "butt engagements," meaning that the gear teeth have abutted against one another without aligning and slipping into meshed engagement. In many starting motor systems if a butt engagement exists cranking will not be initiated and a steady current will flow through, and quickly burn out, the pull-in coils. In other cases of butt engagement cranking will begin and the high armature acceleration prevalent in heavy duty starters often prevents the teeth from properly meshing and can cause the teeth on the pinion gear driven by the starter motor to "skate" on the teeth of the ring gear, seriously damaging the gear teeth. When skating occurs serious milling and grinding of the gear teeth may result which can burr the gearing to the extent that subsequent meshing is prevented. In gas turbines where larger diameter pinions are desired for the higher rotor speeds necessary for starting, the peripheral teeth speed is much higher than the smaller pinions used in internal combustion engines and the damage caused by skating can completely disable the cranking gear train.

Obviously this skating action between the gear teeth resulting from butt engagement where heavy duty starting motors are utilized, will decrease the service life of the gear train and makes it difficult to control in automatic starting cycles where no manual control is being employed, by which the operator can immediately release the start button when hearing the grinding and milling noise resulting from skating between the gear teeth. Often in such automatic systems gear skating becomes unreasonably prolonged due to the delay in sensing this condition in the automatic sequencing mechanisms. A further problem in wholly automatic starting cycles is that the total starting sequence must be reset (often manually) for a new sequence to be employed for the start. Of course, such a situation in automatic start systems on motor or turbine generator sets or like equipment is very undesirable and repuires constant surveillance.

Another problem occurs when using the larger size pinion gears, such as those used in cranking gas turbines, which is cocking of the pinion gear on the drive splines which tends to increase the incidence of butt engagements and prevents the effectiveness of helical splines to facilitate proper indexing or meshing of the gear teeth. Often the edges of the teeth of the pinion gear and the ring gear are chamfered to facilitate proper indexing or meshing of the gear teeth, and while sometimes effective in decreasing butt engagements, it enhances the chances of skating between the gear teeth should a butt engagement occur when using heavy duty starting motors with high armature acceleration. Thus, the number of butt engagements in heavy duty cranking motor systems which can be tolerated is very limited and there is a need for a starting motor system which has nearly absolute reliability of gear train mesh before the cranking cycle begins.

Accordingly, it is an object of this invention to provide a starter motor system which will insure proper meshing of the gear teeth in every cranking cycle, before cranking begins.

Another object of this invention is the provision of a starting motor system for heavy duty starting motors which provides 100% reliability of gear train engagement before cranking begins, at an economical cost and which allows the employment of commercially available starting gear trains.

Other objects and advantages of the invention which will be apparent in the description which follows can be accomplished by a programmed, two-stage starting system for heavy duty starting motors which rotates the starting motor slowly and at a low torque for indexing the gear train while a pinion gear is being shifted into meshing engagement with a ring gear, thereby insuring positive engagement of the gear teeth prior to applying full current to an electric starting motor driving the pinion for cranking the engine.

The invention can be better understood by reference to the accompanying drawings wherein:

FIG. 1 is a section of a heavy duty starting motor assembly having a solenoid controlled shift for obtaining gear train engagement modified in accordance with this invention; and FIG. 2 is a simplified electrical schematic of the starting motor system shown in FIG. 1.

Referring to FIG. 1, a heavy duty starter housing 10 contains a series wound motor 11 whose armature shaft 12 extends through a gear train cavity 13 and has its outboard end journaled in bearing 14 recessed in the engine structure when the housing is mounted on the engine with bolts 15. A shift assembly 16 mounted on the armature shaft so that it can be axially moved thereon, includes a shift collar 17 connected to a drive hub 18 through a one-way clutch 19. Mounted on the drive hub is a pinion gear 20 which can move axially on the hub on splines 21 against the pressure of spring 22 urging the pinion gear toward the outboard end of the hub where a snap ring 23 limits its outboard axial travel. The splines between the pinion gear and the hub can be spiral or straight; the spiral splines are usually desired since they improve indexing.

The shift collar 17 is loosely splined to the armature shaft 12 on involute splines 24 adjacent to the motor 11 so that the collar can move axially along the armature shaft and still be keyed thereto so that no rotary motion can occur between these parts. The other portions of the shift assembly are carried on sleeve bearings 25 which allow relative rotation of the hub 18 on the armature shaft, but fit loosely enough so that this hub can slide axially therealong.

During a starting cycle, shift arm 26 pivoted on the starter housing 10 with pin 27 and engaging the shift collar 17 with its forked end 28, moves the shift assembly axially toward the outboard end of the armature shaft 12 carrying the pinion gear 20 into engagement with ring gear 29 connected directly to the engine's rotary power train. It is during this shift that butt engagements between the teeth on the pinion gear and the ring gear often occur, and the movement of the pinion gear axially on the hub on splines 21 against the pressure of spring 22 avoids jamming the gears together as they come into contact. If the shift lever is actuated with considerable force and acceleration, the gear teeth will be slammed together quite sharply. When larger pinion gears are employed, the pinion will often cock on the hub, and prevent further movement of the shift assembly, resulting in burn out of the pull-in coils. If shift assembly travel is completed and a butt engagement occurs when cranking begins, skating between the gear teeth is likely to occur with resulting milling, grinding and burring of the teeth, as previously discussed.

Basically, this invention avoids the above problem by a programmed control of the starting motor when using a solenoid for shifting the gear train into meshing engagement whereby positive gear mesh is obtained prior to the cranking of the engine. This arrangement is shown in FIG. 1 wherein a solenoid 30 controls shift arm 26 through a connection to it with plunger 31. A return spring 32 acting between the body of the housing and the shift arm maintains the gear train out of cranking engagement when the solenoid is not energized. The program of the starting system will be better understood by reference to the simplified electric schematic shown in FIG. 2 to which reference is now made.

In FIG. 2 battery 40 supplies the necessary current for electric motor 11 during cranking, and also for the operation of solenoid 30 to shift the gear train into meshing engagement prior to connecting power terminals 41 with bus bar 42 which then applies full current to the motor for cranking. In operation, when starting switch 43 is depressed a pull-in winding 45 and a hold-in winding 46 are connected in parallel to battery current for actuation of the plunger which shifts the gear train into engagement and subsequently connects power terminals 41 for cranking.

Current for the pull-in winding 45 passes through the motor winding, but is not sufficient to effect rotation of the armature. If the current through the pull-in winding is increased sufficiently to effect rotation of the starting motor, the plunger will have high acceleration rates slamming the gears together with accompanying damage if they are not properly indexed when coming into contact with one another. Thus, excessive amounts of current should not be passed through the pull-in coil since this is detrimental to the gear train. In the instant invention, a circuit 47 which is connected parallel to pull-in coil 45 in the battery circuit, connects the battery 40 through the windings of starting motor 11 and switch 48. This parallel circuit provides additional current through the motor windings to that passing therethrough due to the current in the pull-in winding and provides sufficient current to rotate the armature of the starting motor slowly, as the solenoid pulls the gear train into meshing engagement. The amount of current passing through both parallel branches of the circuit is such that the starting motor develops approximately 10 foot pounds of torque for indexing the gear teeth in the gear train as they are shifted into engagement. By controlling the current in circuit 47 with the proper resistance, represented by $R_1$, the desired torque can be developed. Further, the circuit can be arranged so that the current passing through the pull-in winding is reduced which prevents the gears from slamming together as sharply as would be the case without circuit 47. This produces lower plunger accelerations and "softer" contact between gear teeth as they ar brought into contact with accompanying increase in service life. Further, since the current passing through the windings of the starting motor is sufficient to rotate it slowly, the gear teeth will be properly indexed or meshed as the shift arm 26 pulls the shift assembly 16 into a position for positive gear engagement prior to the time that bus bar 42 connects the power terminals 41 together.

When the power terminals 41 are connected by bus bar 42, full current is applied to the windings of the starter motor 11 and cranking of the engine begins. Since the previous rotation of the starting motor has insured positive teeth mesh prior to this time, no skating or gear damage will occur. The current passing through the windings prior to the connecting of the power terminals is only sufficient to develop approximately 10 foot pounds of torque, and the rotation of the starting motor will stop once gear train mesh or indexing has been achieved.

When the travel of the plunger 31 of the solenoid 30 is sufficient to connect power terminals 41 with bus bar 42, circuit 47 and pull-in coil 45 are effectively shorted out and hold-in coil 46 will maintain the plunger in the cranking position because of the potential drop across the motor winding during cranking and the parallel connection of the hold-in coil in the battery circuit. Thus the current is sufficient to hold the plunger in the energized, or cranking position until the start switch 43 is released opening the circuit to the hold-in coil and allowing spring 32 to return the plunger and shift lever to the non-cranking position.

In this novel cranking system, it is possible to connect circuit 47 to the same terminal of switch 43 to which hold-in coil 46 and pull-in coil 45 are connected so that one switch 43 can be used. If this is done, a heavier switch 43 is required since more current passes through the switch and also a diode must be included in circuit 47 to prevent the hold-in coil from being energized through circuit 47 when starting switch 43 is released. The addition of a diode in FIG. 2 will actually operate as a switch in the above situation preventing current flow in the hold-in coil from holding in the plunger when the start switch is released. Of course, the addition of a diode 50 to the circuit shown in FIG. 2 would not affect its performance since switch 48 simultaneously opens the circuit 47 on release of switch 43 since the two are ganged together.

Switches 43 and 48 shown ganged in FIG. 2 are very simple, solenoid operated switches which are adequate to illustrate the invention. In FIG. 1, the preferred embodiment, the simple switches are replaced with magnetic switches 43m and 48m, with the latter one energized by the former which makes the circuit ideal for automatic starting systems. In this arrangement, the circuit 47 is controlled by a magnetic switch which is isolated from the control windings of starting switch 43m. In automatic control systems where voltage spikes are used to sequence the control, two spikes are not present due to the collapse of the magnetic field of the switch controlling circuit 47 since only switch 43m is connected in the control circuit. Further, less current demand is required from the control system, and maximum performance can be achieved utilizing magnetic switches which are cheaper than diodes.

As the engine starts during the cranking cycle, overrun clutch 19 allows pinion gear 20 to freewheel on the armature shaft due to driving by the ring gear until the shift assembly 16 is retracted sufficiently to disengage the pinion gear from the ring gear. This conventional clutch arrangement prevents the pinion from driving the starter at high speeds after a start.

By utilizing this invention, it is sometimes not necessary to chamfer the edges of the gear teeth to improve indexing of the gear train as is discussed in the aforementioned Smith patent.

In actual tests it was shown that the life of the gear train could be extended over 400% by utilizing the invention and that 100% reliability in proper meshing could be achieved in the gear train prior to cranking of the engine. Further, the reliability has proven especially useful in gas turbine cranking systems where the starting sequence is automatically controlled.

Having described my invention, I claim:

1. In a starting system for cranking engines which includes an electric cranking motor having a protruding shaft, a shift assembly mounted on said shaft, a gear connected to rotate with said shaft attached so it is axially slidable on said shaft to engage and disengage with the cranking gearing of an engine, said gear coupled to said shift assembly for axial movement by it, and an electric solenoid connected to said shift assembly for operating it, said solenoid having switch means for directly connecting the windings of said electric cranking motor to a power source, the improvement comprising a separate resistive circuit connected to a power source in parallel with said solenoid so both said resistive circuits and said solenoid are connected in series with the windings of said cranking motor to said power source, said resistive circuit including switch means to energize it simultaneously with the energization of said solenoid so the combined current passing through the solenoid and said resistive circuit is sufficient to cause said cranking motor to turn at a low R.P.M. as its gear is advanced for engagement with the cranking gearing of the engine and high solenoid accelerations are avoided, said resistive circuit including a diode to prevent reverse current flow when said resistive circuit is de-energized.

References Cited

UNITED STATES PATENTS

| | | | |
|---|---|---|---|
| 1,079,725 | 11/1913 | Rushmore | 290—38.1 |
| 1,143,194 | 6/1915 | Henderson | 290—38.1 |
| 1,246,207 | 11/1917 | Wilson | 290—38.1 |
| 1,274,575 | 8/1918 | Midgley | 290—38.1 |
| 1,683,280 | 9/1928 | Arthur | 290—36 |
| 2,925,810 | 2/1960 | Mendenhall | 290—38 X |
| 3,037,124 | 5/1962 | Carlson | 290—36 |
| 3,223,863 | 12/1965 | Preece et al. | 290—38 X |

ORIS L. RADER, *Primary Examiner.*

G. R. SIMMONS, *Assistant Examiner.*

U.S. Cl. X.R.

290—38